United States Patent
Zimmer et al.

(10) Patent No.: US 8,010,799 B2
(45) Date of Patent: *Aug. 30, 2011

(54) PRE-BOOT FIRMWARE BASED VIRUS SCANNER

(75) Inventors: Vincent J. Zimmer, Federal Way, WA (US); Michael A. Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 12/463,181

(22) Filed: May 8, 2009

(65) Prior Publication Data

US 2009/0282486 A1    Nov. 12, 2009

Related U.S. Application Data

(63) Continuation of application No. 10/441,506, filed on May 19, 2003, now Pat. No. 7,549,055.

(51) Int. Cl.
  *G06F 11/30* (2006.01)
  *G06F 11/00* (2006.01)
(52) U.S. Cl. ......................... 713/188; 726/24
(58) Field of Classification Search .................... 726/22, 726/24; 713/188, 2
  See application file for complete search history.

(56) References Cited

U.S. PATENT DOCUMENTS

| | | | | |
|---|---|---|---|---|
| 5,475,839 A * | 12/1995 | Watson et al. | ..................... | 713/2 |
| 5,511,184 A * | 4/1996 | Lin | ................. | 710/261 |
| 5,680,547 A * | 10/1997 | Chang | ........................... | 709/222 |
| 5,802,277 A * | 9/1998 | Cowland | ......................... | 726/22 |
| 6,338,141 B1 * | 1/2002 | Wells | ............... | 726/24 |
| 6,347,375 B1 * | 2/2002 | Reinert et al. | .................. | 726/24 |
| 6,625,730 B1 * | 9/2003 | Angelo et al. | ..................... | 713/2 |
| 6,851,057 B1 * | 2/2005 | Nachenberg | ................... | 726/24 |
| 6,907,524 B1 * | 6/2005 | Huntington et al. | .......... | 713/164 |
| 2003/0131248 A1 * | 7/2003 | Huang | .......................... | 713/188 |
| 2004/0205362 A1 * | 10/2004 | Catherman et al. | ........... | 713/300 |

* cited by examiner

*Primary Examiner* — Eleni A Shiferaw
*Assistant Examiner* — Ali S Abyaneh
(74) *Attorney, Agent, or Firm* — Schwabe, Williamson & Wyatt, P.C.

(57) ABSTRACT

The present disclosure relates to allowing the utilization of a virus scanner and cleaner that operates primarily in the pre-boot phase of computer operation and, more particularly, to allowing the utilization of a virus scanner and cleaner that operates primarily during the loading of an operating system.

20 Claims, 2 Drawing Sheets

PRE-BOOT FIRMWARE BASED VIRUS SCANNER

RELATED APPLICATION

This application is a continuation application of U.S. patent application Ser. No. 10/441,506 entitled "PRE-BOOT FIRMWARE BASED VIRUS SCANNER" filed May 19, 2003 the entire contents of which are hereby incorporated by reference in their entirety.

BACKGROUND

1. Field

The present disclosure relates to allowing the utilization of a virus scanner and cleaner that operates primarily in the pre-boot phase of computer operation and, more particularly, to allowing the utilization of a virus scanner and cleaner that operates primarily during the loading of an operating system.

2. Background Information

Typically, the operation of a computer or processing system (hereafter, "computer") may be divided into two stages, pre-boot and runtime. The pre-boot process or phase often comprises starting or resetting a computer. When first turned on (cold boot) or reset/rebooted (warm boot), a computer executes the software that loads and starts the computer's operating system and prepares it for use. Thus, the computer can be said to pull itself up by its own bootstraps. The runtime process or phase often occurs after the pre-boot phase and includes the execution of an operating system and other user applications. The runtime phase is typically the phase that users interact with the computer. Thus, the computer can be said to being running application programs. It is contemplated that a computer or processing system includes devices, such as, for example, mobile or stationary computers, personal digital assistants, telecommunication devices and/or similar devices that each include a processor, a storage medium readable or accessible by the processor (including volatile and non-volatile memory and/or storage elements).

In this context, the term "virus" may refer to an intrusive program that infects computer files by inserting in those files copies of itself or a "virus" may refer to a mutation of a binary data image (i.e. a file that has been altered by an intrusive program). The copies may be executed when the file is loaded into memory, allowing them to infect still other files, and so on. Viruses often, but not always, have damaging side effects—sometimes intentionally, sometimes not. For example, some viruses may destroy a computer's hard disk or take up memory space that could otherwise be used by programs. In this context, a virus may also include programs, such as, for example, a destructive program that is disguised as a benign program (i.e. a Trojan Horse), a program that covertly performs an operation without the user's consent or knowledge (e.g. spyware), or other unfriendly programs. During the pre-boot phase virus infected files may be particularly troubling. Normally, in the pre-boot phase all of the software executes in the most privileged processor mode and there is no protection of the memory space. In addition, pre-boot software may be loaded from adapter cards or from across a network.

Typically, computer systems scan, or search files, for viruses during the runtime phase of operation. Common commercial virus scanning techniques include scanning a file system for viruses after the operating system is running. However, by only scanning for viruses during the runtime phase, any viruses which may load or execute during the pre-boot phase or that portion of the runtime phase prior to the running of the virus scanner are unchecked. Furthermore, because current techniques for detecting virus infections run after the operating system is running, the techniques depend and/or are tailored to the specific host operating system. A need, therefore, exists for an improved system or technique for implementing a virus scanning device.

BRIEF DESCRIPTION OF THE DRAWINGS

Subject matter is particularly pointed out and distinctly claimed in the concluding portions of the specification. The disclosed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as to not obscure the disclosed subject matter.

Figure 1:
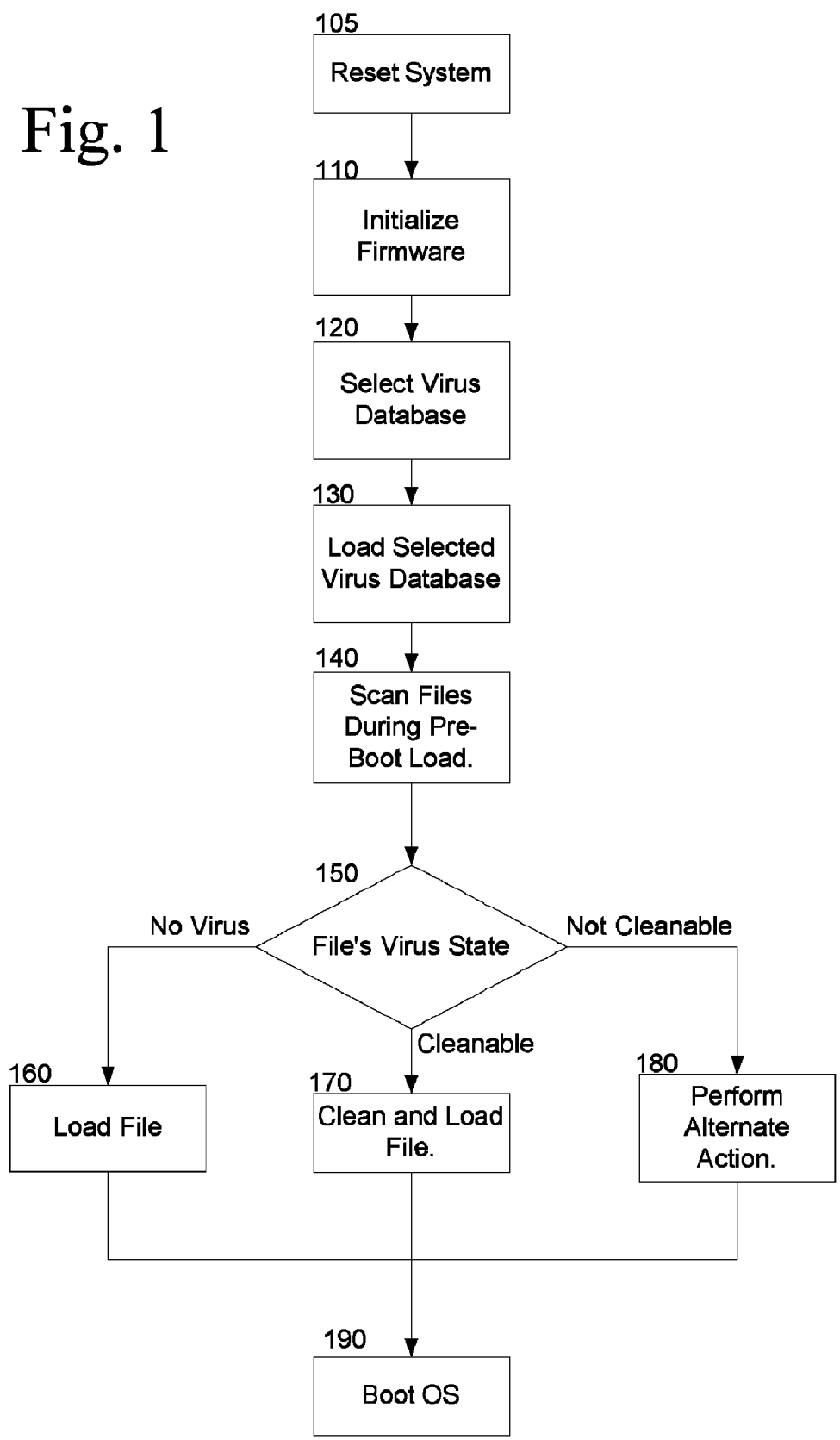
FIG. 1 is a flowchart illustrating an embodiment of a technique for allowing the utilization of virus scanning in accordance with the disclosed subject matter.

FIG. 1 is a flowchart illustrating an embodiment of a technique for allowing the utilization of virus scanning in accordance with the disclosed subject matter. In one embodiment, the technique may include block 105 that illustrates that the system may be reset, and block 190 that illustrates the booting of the operating system (OS). In short, it is contemplated that one embodiment of the disclosed subject matter may occur during the pre-boot phase (i.e., between block 105 and block 190). However, the disclosed subject matter is not limited to the pre-boot phase and performing a portion of the technique during the runtime phase is contemplated.

In one specific embodiment, the instructions illustrated by blocks 105, 110, 120, 130 & 140 may be executed as a portion of trusted code, such as for example, a hardware boot block. In a specific embodiment, the instructions embodying the disclosed blocks may be substantially complaint with a security scheme such as, for example, the one encapsulated by the Trusted Computing Group (TCG) Main Specification. *Trusted Computing Group (TCG) Main Specification* v 1.1b, Trusted Computing Group Inc. 2003 (hereafter, "the TCG specification"). The hardware boot block or trusted computing base (TCB), in this embodiment, may be a priori be trusted in that the code authorizes subsequent modules that may be loaded. This code may be referred to, in the parlance of the TCG Specification, as a Trusted BIOS Base (TBB).

Block 110 illustrates that, in one embodiment, a substantial portion of the pre-boot firmware may initialize and/or test the integrity of the hardware system. In one embodiment, the hardware system may perform a variation of a power-on self-test (POST) that tests various system components, such as, for example, Random Access Memory (RAM), the disk drives, and the keyboard, to see if they are properly connected and operating. In another embodiment, the hardware system may perform actions substantially compliant with those defined in the Extensible Firmware Interface (EFI) specification. *Extensible Firmware Interface (EFI) Specification*, ver 1.02, Dec. 12, 2000, Intel Corp. (hereafter, "the EFI specification"). However, this is merely one specific embodiment of the disclosed subject matter. It is further contemplated that in some embodiments other than the one illustrated by FIG. 1, the process illustrated by block 110 may occur at different sections of the technique, or possibly, not at all.

In a specific embodiment substantially conforming to the EFI specification, the instructions embodying the disclosed subject matter may be formatted in a manner substantially compliant with the Microsoft Portable Executable (PE) format. *Microsoft Portable Executable and Common Object File Format Specification*, Version 6.0, February, 1999, Microsoft Corp (hereafter, "the PE format"). In this embodiment, the instructions illustrated by FIG. 1 may run in the most privileged execution mode as a peer to other executable pre-boot agents. It is contemplated that other EFI and non-EFI embodiments may exist that do not conform the PE format.

Block 120 illustrates that a system may select a virus database. In this context, a "virus database" may be a collection of data that includes information to facilitate the identification of viruses or files affected by viruses. Such a database may include virus signatures or checksums that correspond to particular viruses. It is contemplated that a virus database may include a number of separate databases or files. It is further contemplated that the database may be stored in a variety of locations, such as, for example, in firmware, in a locally accessible non-volatile memory, a network accessible medium, or other storage location. In one embodiment, the virus database, may be stored within a portion of firmware.

In one embodiment, block 120 may also illustrate that a determination regarding which of multiple available virus databases will be utilized by the technique. It is contemplated that, in one embodiment, a system may include a virus database stored within, for example, firmware and a second virus database stored within, for example, a hard drive; however, other storage locations and configurations are within the scope of the disclosed subject matter. Block 120 illustrates that one of the two available databases, in this embodiment the firmware database and the hard drive database, may be selected and utilized. It is contemplated that the selection process may be based, upon a number of factors, such as, for example, availability, size of the database, reliability of the database, age of the database, or other possible factors. It is also contemplated that a particular database may be selected for some portion of the technique and another database selected for a second portion of the technique. It is contemplated that in some embodiments, the virus database may be accessible and editable during the runtime phase of operation.

In one embodiment, the virus database may be updated based upon a local policy engine settable by a Firmware Setup program. Alternatively, the virus database may be accessible via a network interface and maintained by a third party, such as, for example, an independent software vendor (ISV), independent BIOS vendor (IBV), an original equipment manufacturer (OEM), or an independent hardware vendor (IHV); however, these are merely a few non-limiting examples. In one embodiment, the virus database may be synchronized with a remote database via a pre-boot networking scheme, such as, for example, the trivial file transfer protocol. *The Trivial File Transfer Protocol, Request For Comments*: 1350, Network Working Group, Rev. 2, Jul. 1992. In another embodiment, an operating system agent, or other runtime agent may retrieve and/or alter the virus database.

Block 130 illustrates that the selected database may be loaded or otherwise made available for reading. In one embodiment, the selected database may be simply read from the firmware. In another embodiment, the selected database may be accessed or loaded via a network interface. It is contemplated that the selected virus database may be accessed via a number of techniques and that the two above embodiments are merely illustrative examples. Such access techniques may include network file transfer protocols—possibly trivial or multicast file transfer protocols—, system bus access to a removable or non-removable drive, and local access to a non-volatile memory element; however, other access techniques are possible and contemplated.

Block 140 illustrates that files may be scanned during the pre-boot loading phase. In this context, "scanning a file for a virus" includes reading at least a portion of the file and asserting if the file includes or has been affected by a virus. This assertion may include the utilization of the virus database selected by the step illustrated by block 120.

It is contemplated that a select number of files may be scanned, or, conversely, that substantially all files may be scanned. In one embodiment, only the files related to the operating system and similar early running programs may be scanned for viruses. In another embodiment, the pre-boot phase firmware may be aware and able to recognize the structure of some or all of the file systems accessible to the system. Some or all of the files on these file systems may be scanned for viruses.

In one embodiment, these files may include EFI driver files that conform to the PE format, as described above. These EFI driver files may be loaded from a variety of sources, such as, for example, an adapter card or via a network interface. These files may also be one of various operating system loaders, possibly conforming to the PE format and of an EFI subsystem type EFI_APPLICATION. In another EFI specific embodiment, 16-bit BIOS runtime and option ROM code may be encapsulated to conform to the EFI specification and may be scanned for a virus infection.

In one embodiment, the behaviour of the file scanning may be controlled by a virus-scan matrix, or preference file. Such a file may list a number of data types, such as, for example, files, storage elements, or file access mechanisms, and correlate those data types with a specific action, such as, for example, scanning a file system's master boot record, scan files only when loaded into volatile memory, not scanning files, and scanning files before the runtime phase is entered; however, it is noted that the above is merely a few non-limiting examples and other data types and actions are contemplated. Furthermore, in other embodiments, a preference file may include "cause and effect" relationships other than described above.

In one specific example, all of the files loaded into memory during the pre-boot phase may be scanned for a virus as, or immediately prior to, the files are loaded into memory. In a second specific example, a list of the files included in the operating system and loaded during the initial startup of the operating system may be scanned for viruses prior to the booting of the operating system. In a third specific embodiment, substantially all of the files accessible in the pre-boot phase may be scanned to viruses. In a fourth specific embodiment, the firmware may perform any of the operations illustrated by the previous three embodiments during the pre-boor phase, and, in addition, during the runtime phase, the firmware may scan any file during file access, via disk or network, by the operating system. These are merely a few non-limiting specific embodiments of the claimed subject matter and other embodiments are contemplated.

In one embodiment, the contents of a signed file may be scanned even if the file's digital signature denotes that the file has not been altered since it was signed. For example, the signature may denote that the file has not been infected by an outside virus; however, the signature may not denote, or be capable of denoting, that the signed file is itself not a virus. In a specific embodiment, the signed file may be signed in a manner substantially compliant with that defined in the Trusted Computing Platform Association (TCPA) specification and its derivatives. *Trusted Computing Platform Association (TCPA) Main Specification*, ver 1.1b, 2000, Compaq Computer Corp. et. al. (hereafter, "the TCPA specification"). Alternatively, it is contemplated that, in some embodiments, a signed file may be regarded as virus free and no scanning of the contents of the signed file may be performed.

In an EFI specific embodiment, the virus database and instructions for scanning may operate in the runtime phase in System Management Mode, which is capable of lockable memory protection. These instructions may provide for scanning of the BIOS runtime regions.

Block 150 illustrates that the file's virus state may be ascertained during the scanning illustrated by block 140. A virus state may include, but is not limited to: a file is not infected with a virus; a file is infected with a virus and the infection may be sufficiently removed, repaired, or cleaned; or a file is infected with a virus and the infection may not be sufficiently removed, repaired, or cleaned. Of course, other file virus states are possible and contemplated and that these above are merely specific illustrative examples.

In one embodiment, information detailing how to clean an infected file may be included in the selected virus database. It is contemplated that in other embodiments, the information needed to clean or repair the file may be stored in a separate file or location. It is also contemplated that a number of actions may be performed based, at least in part, upon the file's virus state. The specific embodiment illustrated by FIG. 1 illustrates three actions; however, other actions are contemplated and within the scope of the claimed subject matter. It is further contemplated that the relationship between file virus state and action performed may be detailed in a virus-scan matrix, referred to in the description of block 140 above.

In one embodiment, illustrated by FIG. 1, the virus state may include, but is not limited to: a file is not infected with a virus; a file is infected with a virus and the infection may be sufficiently removed, repaired, or cleaned; or a file is infected with a virus and the infection may not be sufficiently removed, repaired, or cleaned. Block 160 illustrates that, in one embodiment, if a file's virus state denotes that the file is not infected it may be loaded into memory. Of course, the illustration of this one specific embodiment, illustrated by block 160, does not preclude other actions coming within the scope of the claimed subject matter.

Block 170 illustrates that, in one embodiment, a file that is infected with a virus may be repaired and loaded into memory. It is contemplated that in some embodiments, the file may be merely repaired or cleaned and not directly loaded into memory. It is further contemplated that the file may be marked for cleaning and the actual cleaning of the file may be delayed until the file is loaded into memory or during a later phase of operation, such as for example, the runtime phase or after a portion of pre-boot initialization has occurred.

Block 180 illustrates that if a file is infected and is not repairable an alternate action may be performed. Such actions may include, but are not limited to, deleting the file, quarantining the file, marking the file as infected, loading the file normally, or performing another action. It is contemplated that in some embodiments, the action performed may be detailed in a virus-scan matrix, as referred to in the discussion of block 140.

Figure 2:
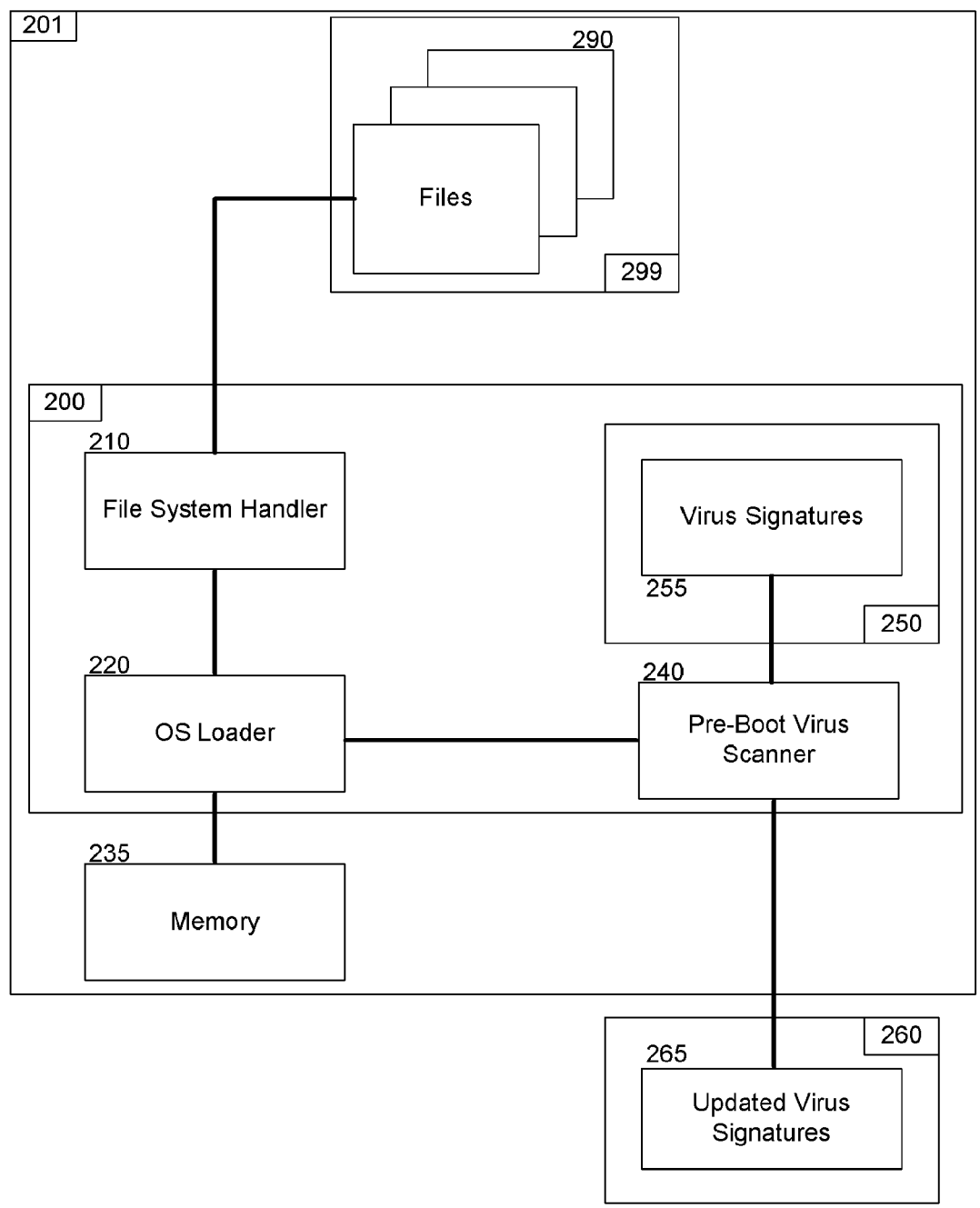
FIG. 2 is a block diagram illustrating an embodiment of an apparatus and a system that allows the utilization of virus scanning in accordance with the disclosed subject matter.

FIG. 2 is a block diagram illustrating an embodiment of an apparatus 200 and a system 201 that allows the utilization of a virus scanner and cleaner that operates primarily in the pre-boot phase of computer operation in accordance with the disclosed subject matter. It is contemplated that an embodiment of such a system may take many forms, such as for example, everything from small handheld electronic devices, such as personal data assistants and cellular phones, to application-specific electronic devices, such as set-top boxes, digital cameras, and other consumer electronics, to medium sized mobile systems such as notebook, sub-notebook, and tablet computers, to desktop systems, workstations, and servers. However, the system is not limited to the forms described above and other forms are contemplated.

In one embodiment, the hardware system 201 may include apparatus 200 and a plurality of hardware devices or components that are capable of being configured with a group of hardware settings. It is contemplated that the hardware system 201 and apparatus 200 may be capable of performing the technique illustrated by FIG. 1 and described above.

In one embodiment, the apparatus 200 may include a file system handler 210 to access to a file system during the pre-boot phase of computer operation. File system handler may facilitate reading from and/or writing to, during the pre-boot phase, the file(s) included within the file system. It is contemplated that the file system handler may also allow access to the file system during the runtime phase. It is further contemplated that the file system handler may allow access to a variety of file systems such as those used by a variety of operating systems or those stored on a variety of volatile or non-volatile memories. Furthermore, it is contemplated that the file system handler may access the file system locally or remotely, such as, for example, via a network.

In one embodiment, the file system handler 210 may access files 290 from a file system 299. It is contemplated that the file system may be stored within a non-volatile or volatile memory. It is further contemplated that the file system may be storage across multiple storage devices, such as, for example, a network drive that is physically stored on multiple hard drives; however, that is merely one non-limiting embodiment of the claimed subject matter. In the embodiment illustrated by FIG. 2, the file system is not part of apparatus 200. It is contemplated that some embodiments of the apparatus may include the file system.

Operating system loader 220 may facilitate the loading of an operating system into memory 235. The loading of the operating system may be part of the transition from the pre-boot to runtime phases of operation. It is contemplated that the operating system loader may facilitate the loading of non-operating system files into memory. In one embodiment, the operating system loader may utilize file system handler 210 to read files associated with the operating system from a file system 299.

Pre-boot virus scanner 240 may scan files before being loaded by the operating system loader 220 to determine if the files have been infected by or are a virus. In one embodiment, the pre-boot virus scanner may perform the actions illustrated by blocks 140, 150, 170, & 180 illustrated in FIG. 1 and described above. It is contemplated that the pre-boot virus scanner may be capable of scanning files during the pre-boot phase and may also be capable of scanning files during the runtime phase. In another embodiment, the pre-boot virus scanner may only be capable of scanning files during the pre-boot phase and not the runtime phase. It is contemplated that the pre-boot virus scanner may be, in one embodiment, a portion or an entire integrated circuit specifically designed to facilitate the virus scanning of files.

Pre-boot virus scanner 240 may utilize a Virus Database 250 to facilitate the scanning of files. In one embodiment, the virus database may be a database as described with reference to block 120 of FIG. 1 described above. It is contemplated that the virus database may include virus signatures 255. It is also contemplated that multiple virus databases may exist and that one or more may be utilized by the pre-boot virus scanner. In one embodiment, an additional virus database 260 may be utilized. The additional virus database may, in one embodiment, include updated virus signatures 265. It is contemplated that the pre-boot virus scanner may select between the two (or more) virus databases, or combine the databases in some fashion. It is further contemplated that the additional database(s) may be stored within or without the apparatus 200, or even within or without system 201. It is also contemplated that the database may be accessed utilizing a networking protocol, such as, for example, multicast, trivial file transfer protocol.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the disclosed subject matter have been illustrated and described herein, many modifications, substitutions, changes, and equivalents will now occur to those skilled in the art. It is, therefore, to be understood that the appended claims are intended to cover all such modifications and changes that fall within the true spirit of the disclosed subject matter.

What is claimed is:

1. A method comprising:
    invoking, by an operating system (OS) loader of a system, a file system handler before loading files associated with an OS on the system during a system;
    upon invocation, accessing, by the file system handler during a pre-boot phase, files associated with the OS;
    scanning, by a pre-boot virus scanner during the pre-boot phase, the files accessed by the file system handler, wherein the scanning includes determining by the pre-boot virus scanner whether the scanned files comprise one or more infected files that are infected with one or more viruses before attempting to load one or more infected files into a memory;
    loading, by the OS loader, one or more of the files associated with the OS that have not been determined by the pre-boot virus scanner to be infected with one or more viruses, to transition the system into a boot phase;
    wherein the OS loader, the pre-boot virus scanner, and the file system handler are operated by a hardware processor of the system.

2. The method of claim 1, further comprising selecting, by the pre-boot virus scanner, a virus database, the selected virus database containing information to facilitate said determining by the pre-boot virus scanner whether the scanned files comprise one or more infected files that are infected with one or more viruses.

3. The method of claim 2, wherein selecting by the pre-boot virus scanner a virus database includes:
    selecting, by the pre-boot virus scanner, a subset of one or more virus databases from a plurality virus databases, said selected virus database being one of the subset of one or more virus databases; and
    loading, by the pre-boot virus scanner, the subset of one or more virus databases from the plurality of virus databases.

4. The method of claim 2, wherein determining whether the scanned files comprise one or more infected files that are infected with a virus comprises utilizing a virus signature that is included in the selected virus database.

5. The method of claim 4, wherein determining by the pre-boot virus scanner whether the scanned files comprise one or more infected files that are infected with a virus includes, for a scanned file comprising a digital signature and contents:
    checking, by the pre-boot virus scanner, that the digital signature of the scanned file is valid;
    determining, by the pre-boot virus scanner, whether the contents of the scanned file are infected with a virus; and
    marking, by the pre-boot virus scanner, the scanned file as being infected with a virus if one or more criteria are met;
    wherein the one or more criteria are chosen from a group including:
        the digital signature of the scanned file being invalid; and
        the contents of the scanned file appearing to be infected with a virus.

6. The method of claim 5, further including:
    attempting, by the pre-boot virus scanner, to repair one or more of the infected files; and
    loading, by the OS loader, one or more repaired infected files into the memory.

7. The method of claim 6, wherein:
    the one or more criteria comprise a predefined set of criteria;
    marking, by the pre-boot virus scanner, the scanned file as being infected with a virus if one or more criteria are met includes utilizing, by the pre-boot virus scanner, the selected virus database to determine if the one or more infected files are repairable; and
    attempting, by the pre-boot virus scanner, to repair one or more of the infected files includes attempting, by the pre-boot virus scanner, to repair respective infected files out of the one or more infected files only if the respective infected files are repairable.

8. The method of claim 1, wherein said scanning is performed utilizing a device including at least one of the following:
- a non-volatile memory coupled to the processor;
- a volatile memory coupled to the processor;
- a locally stored file system; and
- a network interface coupled to the processor.

9. An apparatus comprising:
- a computer hardware processor;
- a file system handler configured, in response to execution on the computer processor, to access files stored within a file system of an operating system (OS);
- an OS loader configured, in response to execution on the computer processor, to invoke the file system handler before loading files associated with the OS; and
- a pre-boot virus scanner, coupled to the OS loader and the file system handler, and configured, in response to execution on the computer processor during a pre-boot phase, to scan files accessed by the file system handler upon invocation during the pre-boot phase;
- wherein the pre-boot virus scanner is configured to scan files by determining, in response to execution on the computer processor, whether the scanned files comprise one or more infected files that are infected with one or more viruses before attempting to load the one or more infected files into a memory; and
- wherein the OS loader is further configured, in response to execution on the computer processor, to load one or more of the files associated with the OS on completion of scanning to transition the apparatus into a boot phase, wherein the loaded files comprise files that have not been determined by the pre-boot virus scanner to be infected with one or more viruses.

10. The apparatus of claim 9, wherein the pre-boot virus scanner is further configured, in response to execution on the computer processor, to operate during a runtime phase of the apparatus following a boot phase.

11. The apparatus of claim 9, further comprising a virus database coupled to the computer processor to facilitate the identification of a virus; and wherein the pre-boot scanner is configured, in response to execution on the computer processor, to utilize the virus database to facilitate the identification of one or more viruses infecting one or more files.

12. The apparatus of claim 11, wherein the pre-boot virus scanner is configured, in response to execution on the computer processor, to select the virus database from a plurality of virus databases.

13. The apparatus of claim 9, wherein the file system handler is in compliance with the Extensible Firmware Interface (EFI) specification.

14. The apparatus of claim 9, wherein the pre-boot virus scanner is configured, in response to execution on the computer processor, to:
- scan a file having a digital signature and a contents;
- check that the digital signature of the scanned file is valid;
- determine if the contents of the scanned file are infected with a virus; and
- mark the scanned file as being infected with a virus if one or more criteria are met;
- wherein the criteria is chosen from a group including:
  - the digital signature being invalid; and
  - the contents of the scanned file appears to be infected with a virus.

15. An article, comprising:
- a non-transitory storage medium having a plurality of machine accessible instructions which, when executed by a processor of a system cause the system to perform:
  - invoking, by an operating system (OS) loader of the system, a file system handler before loading files associated with an OS on the system;
  - upon invocation, accessing, by the file system handler during a pre-boot phase, files associated with the OS;
  - scanning, by a pre-boot virus scanner during the pre-boot phase, the files accessed by the file system handler, wherein the scanning includes determining by the pre-boot virus scanner whether the scanned files comprise one or more infected files that are infected with one or more viruses before attempting to load the one or more infected files into a memory;
  - loading, by the OS loader, one or more of the files associated with the OS that have not been determined by the pre-boot virus scanner to be infected with one or more viruses, to transition the system into a boot phase.

16. The article of claim 15, wherein the instructions, when executed, further cause the system to perform:
- selecting, by the pre-boot virus scanner, a subset of one or more virus databases from a plurality virus databases, said selected virus database being one of the subset of one or more virus databases; and
- loading, by the pre-boot virus scanner, the selected subset of one or more virus databases from the plurality of virus databases.

17. The article of claim 15, wherein determining by the pre-boot virus scanner whether the scanned files comprise one or more infected files that are infected with a virus includes utilizing a virus signature that is included in a virus database.

18. The article of claim 17, wherein determining by the pre-boot virus scanner whether the scanned files comprise one or more infected files that are infected with a virus includes, for a scanned file comprising a digital signature and contents:
- checking, by the pre-boot virus scanner, that the digital signature of the scanned file is valid;
- determining, by the pre-boot virus scanner, whether the contents of the scanned file are infected with a virus; and
- marking, by the pre-boot virus scanner, the scanned file as being infected with a virus if one or more criteria are met;
- wherein the criteria is chosen from a group including:
  - the digital signature of the scanned file being invalid; and
  - the contents of the scanned file appearing to be infected with a virus.

19. The article of claim 18, wherein the instructions when executed further cause the system to perform:
- attempting, by the pre-boot virus scanner, to repair one or more of the infected files; and
- loading, by the OS loader, one or more repaired infected files into the memory.

20. The article of claim 19, wherein:
- the one or more criteria comprise a predefined set of criteria;
- marking the scanned file as being infected with a virus if one or more criteria is met includes the pre-boot virus scanner utilizing a virus database to determine if the one or more infected files are repairable; and
- attempting to repair one or more of the infected files includes the pre-boot virus scanner attempting to repair respective infected files out of the one or more infected files only if the respective infected files are repairable.

* * * * *

UNITED STATES PATENT AND TRADEMARK OFFICE
CERTIFICATE OF CORRECTION

| | | |
|---|---|---|
| PATENT NO. | : 8,010,799 B2 | Page 1 of 1 |
| APPLICATION NO. | : 12/463181 | |
| DATED | : August 30, 2011 | |
| INVENTOR(S) | : Vincent J. Zimmer et al. | |

It is certified that error appears in the above-identified patent and that said Letters Patent is hereby corrected as shown below:

In the Specification

Column 7

Line 63, "the system during a system;" should read --the system;--.

Signed and Sealed this
Seventeenth Day of September, 2013

Teresa Stanek Rea
*Deputy Director of the United States Patent and Trademark Office*